United States Patent
Crossman

(10) Patent No.: US 6,325,439 B1
(45) Date of Patent: Dec. 4, 2001

(54) HANGING STORAGE UNIT FOR A TRUCK CARGO BAY

(75) Inventor: Scott P. Crossman, Rockford, MI (US)

(73) Assignee: Steffens Enterprises, Inc., Grand Rapids, MI (US)

(*) Notice: Subject to any disclaimer, the term of this patent is extended or adjusted under 35 U.S.C. 154(b) by 0 days.

(21) Appl. No.: 09/336,632

(22) Filed: Jun. 18, 1999

(51) Int. Cl.⁷ .................. B60N 3/12; B60R 5/00; B60R 7/00; B60R 9/00; B60R 11/00

(52) U.S. Cl. .................... 296/37.6; 296/100.09

(58) Field of Search .................. 296/37.1, 37.6, 296/100.09; 220/4.28, 4.33, 529

(56) References Cited

U.S. PATENT DOCUMENTS

| | | |
|---|---|---|
| 4,199,188 | 4/1980 | Albrecht et al. |
| 4,313,636 | 2/1982 | Deeds |
| 4,418,954 | 12/1983 | Buckley |
| 4,558,797 * | 12/1985 | Mitchell |
| 4,615,557 | 10/1986 | Robinson |
| 4,747,441 | 5/1988 | Apolzer |
| 4,813,735 | 3/1989 | Avitable |
| 4,824,162 | 4/1989 | Geisler |
| 4,828,312 * | 5/1989 | Kinkel et al. |
| 4,844,531 | 7/1989 | Kooiker |
| 4,861,092 | 8/1989 | Bogard |
| 4,909,561 | 3/1990 | Lovaas |
| 4,946,217 | 8/1990 | Steffens et al. |
| 5,087,093 | 2/1992 | Repetti |
| 5,183,309 | 2/1993 | Jordan |
| 5,201,561 | 4/1993 | Brown |
| 5,253,913 * | 10/1993 | Metivier |
| 5,263,761 | 11/1993 | Hathaway |
| 5,299,722 * | 4/1994 | Cheney |
| 5,344,159 | 9/1994 | Powell |
| 5,350,213 | 9/1994 | Bernardo |
| 5,368,354 | 11/1994 | Martin |
| 5,427,428 | 6/1995 | Ericson |
| 5,480,206 | 1/1996 | Hathaway |
| 5,636,893 * | 6/1997 | Wheatley et al. |
| 5,653,491 | 8/1997 | Steffens et al. |
| 5,961,173 * | 10/1999 | Repetti |
| 5,996,828 * | 12/1999 | Cheyn |
| 6,024,402 * | 2/2000 | Wheatley |
| 6,056,177 * | 5/2000 | Schneider |
| 6,095,588 * | 8/2000 | Rodosta |

* cited by examiner

Primary Examiner—Stephen T. Gordon
Assistant Examiner—Scott Carpenter
(74) Attorney, Agent, or Firm—Warner Norcross & Judd LLP

(57) ABSTRACT

A storage unit for a truck bed includes a container sized to fit between the truck bed sidewalls. Support portions extend leftward and rightward from the upper corners of the container. The support portions are adapted to rest on the top of the truck bed sidewalls to suspend the container within the truck bed. The container is suspended at or below the plane defined by the support portions. The support portions have a relatively low profile height so that the storage unit is useful in conjunction with a low profile or low silhouette truck bed cover.

20 Claims, 6 Drawing Sheets

HANGING STORAGE UNIT FOR A TRUCK CARGO BAY

BACKGROUND OF THE INVENTION

The present invention relates to a storage unit adapted for installation in a pickup truck bed or cargo bay, and more particularly to a storage unit supported by the pickup bed sidewalls.

A cargo bay or bed of a pickup truck is useful for storing articles such as tools or parts during transport; however, a pickup truck user often does not need the full capacity of the truck bed to store these articles. Therefore, to organize the stored articles —and also prevent the stored articles—from sliding around the pickup truck bed during transport—the user may wish to stow the articles in a smaller storage unit installed in the cargo bay.

However, a truck user often desires the availability of the full area of the truck bed floor to store large objects—such as sheets of plywood—without the inconvenience of removing a storage unit from the cargo bay. Therefore, storage units are typically mounted to the truck bed sidewalls to avoid resting or taking up space on the truck bed floor.

For example, a tool box can be mounted to pickup truck bed sidewalls as a storage unit. U.S. Pat. No. 4,199,188 issued Apr. 22, 1980 to Albrecht entitled "Vehicle Accessory System" discloses a tool box 140 with side portions extending over the side walls of the pickup bed to support the tool box above the truck bed floor. (FIG. 14.) The tool box includes a pair of covers 146, 148 on opposite sides of the tool box and hinged at the center of the box to provide access to either side of the tool box by opening one of the covers. (Column 7, lines 4–15.) However, a disadvantage of the Albrecht tool box storage unit is that it extends substantially above the pickup bed side walls to preclude installation of the tool box with a pickup bed cover having a low silhouette or profile height.

Pickup bed covers are often used to protect the truck cargo bay space from the weather and also help to reduce theft of stored items by minimizing the visibility of and unauthorized access to articles stored in the truck bed. A popular type of pickup bed cover has a low silhouette or profile height— so that the cover does not extend substantially above the tops of the cargo bay sides. Low profile height bed covers provide the advantages of an unobstructed driver's view out the rear of the truck bed cab, less wind drag in comparison to other bed covers, and a sleek, finished look that appeals to consumers. Several types of low profile bed covers exist, including: i) a rigid cover that is bolted or clamped to the truck bed to secure it in place, and ii) a flexible cover of watertight material, such as waterproofed canvas or plastic, that is stretched and tied down or snapped to the sides of the cargo bay.

Several useful low silhouette folding cargo bay covers are shown and described in U.S. Pat. No. 4,844,531 issued Jul. 4, 1989 to Kooiker entitled "Folding Cover for Pickup Box"; U.S. Pat. No. 4,946,217 issued Aug. 7, 1990 to Steffens entitled "Pickup Box Covers"; and U.S. Pat. No. 5,653,491 issued Aug. 5, 1997 to Steffens entitled "Folding Cargo Bay Cover for Pickup Trucks." The folding cover includes four hinged panels that can be unfolded to lay flat on top of the truck bed sidewall of a pickup truck. The folding cover can be quickly and easily folded, one upon the other, to gain access to or expose the pickup truck cargo bay. Even when the low profile cover is folded so that the cargo bay is open, the cover provides a compact stack that i) is not substantially affected by the moving truck's slip stream and ii) does not obstruct the view through the rear window of the truck cab.

These low silhouette cargo bay covers are incompatible with existing storage units that are designed to hang from the sidewalls of pickup truck cargo bays because these existing storage units extend substantially above the pickup bed sidewalls. Thus, a low silhouette cargo bay cover cannot lay substantially flat on the top of the pickup cargo bay sidewalls because the height of the existing storage units disrupts the installation of the cover.

SUMMARY OF THE INVENTION

The aforementioned problems are overcome in the present invention wherein a storage unit is adapted for suspension from the sidewalls of a truck bed in conjunction with the installation of a low silhouette cargo bay cover. More specifically, the storage unit includes a container sized to fit entirely between the truck bed sidewalls. Support portions extend leftward and rightward from the upper left and right edges of the container. The support portions are adapted to rest on the top of the truck bed sidewalls to suspend the container within the truck bed. The suspended container lies entirely within or below the plane defined by the support portions of the storage unit. The support portions have a relatively low profile height so that the storage unit can be used with a low profile truck bed cover.

In a preferred embodiment, the container includes a plurality of frame members interconnected to form a rectangular-sided polyhedron shaped frame. A joint connector connects three frame members to form each corner of the container. The frame members include panel slots to receive panels that form the walls and floor of the container. The container can be suspended from the truck sidewalls by hanger support portions. Each panel support portion, which suspends the container from the truck sidewalls, also extends from a hanger base plate mounted to the joint connector.

The storage unit of the present invention provides several advantages. First, the storage unit can be used in conjunction with existing low profile or low silhouette truck bed covers— including folding truck bed covers—because the storage unit does not extend substantially above the tops of the truck bed sidewalls. Thus, the storage unit and its contents can be protected from the weather and hidden from view under the truck bed cover to reduce theft of stored articles. The storage unit can be easily moved to a desired position along the length of the truck bed. Storage capacity can be expanded simply by installing multiple storage units. The usefulness of the storage unit is enhanced by incorporating removable and slidable hanging trays or hooks in the frame of the storage unit. Further, the storage unit does not rest on the floor of the truck bed, so that the full area of the cargo bay floor is available to store plywood and the like. Also, the storage unit can be shipped and stored in a compact disassembled state. The storage unit can be constructed of lightweight materials, such as plastic and aluminum, to decrease shipping costs and also minimize the weight contribution to the truck in which the storage unit is installed.

These and other objects, advantages, and features of the invention will be more readily understood and appreciated by reference to the detailed description of the preferred embodiment and the drawings.

DETAILED DESCRIPTION OF THE PREFERRED EMBODIMENT

Figure 1:
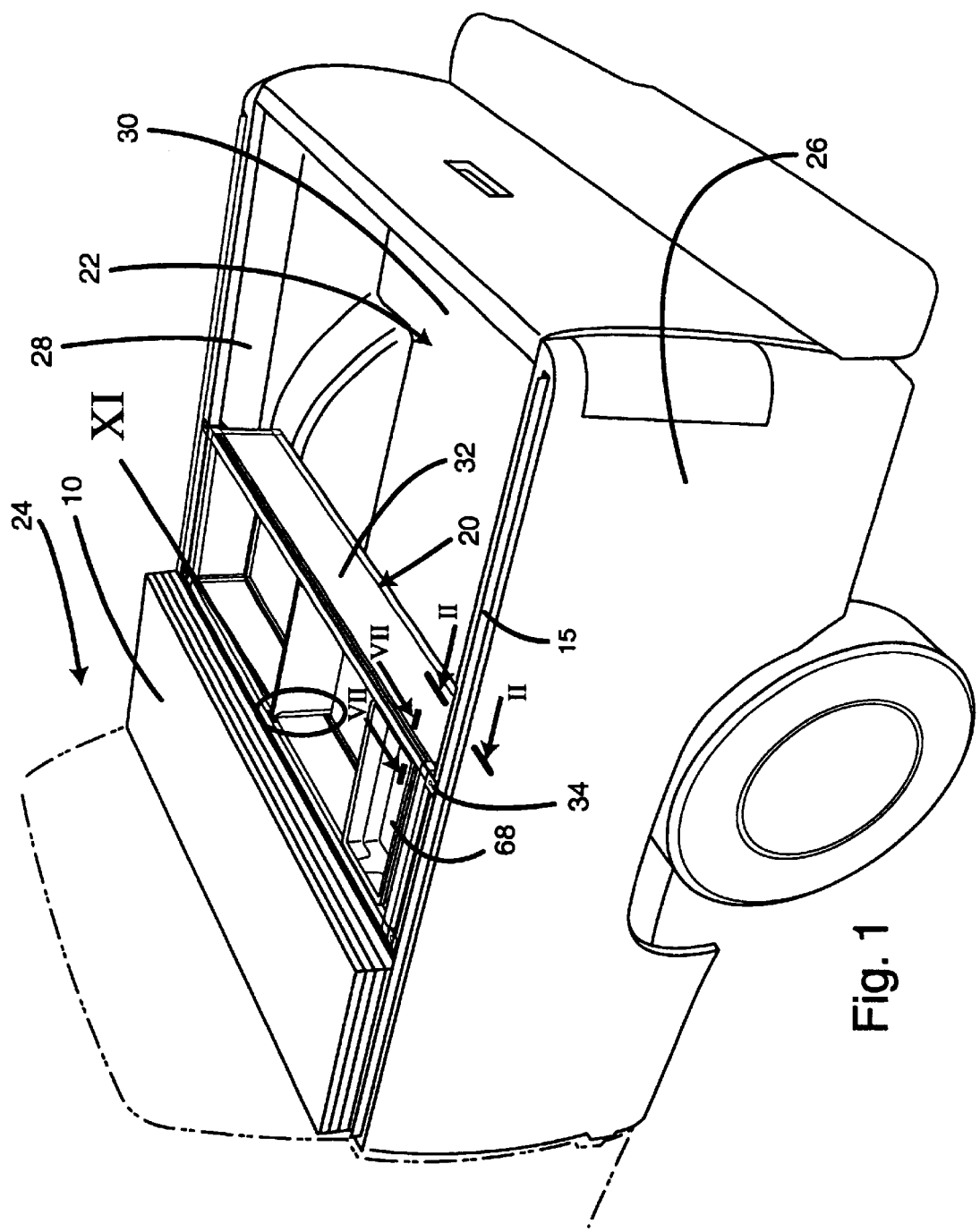
FIG. 1 is a perspective view of the storage unit installed in a truck cargo bay having a folding cargo bay cover in the folded position.

Storage unit 20 of the present invention is installed in truck bed or cargo bay 22 of pickup truck 24. (FIG. 1.) Cargo bay 22 is formed by left sidewall 26, right sidewall 28, and floor 30. Storage unit 20 includes a container 32 sized to fit between the left sidewall 26 and the right sidewall 28. Hangers 34 extend from the container to rest on the top of sidewalls 26 and 28 so that storage unit 20 is suspended from the truck bed sidewalls. Folding cover 10 (shown in the folded position) extends between and rests on top of left sidewall 26 and right sidewall 28. The cover 10 can be unfolded to cover storage unit 20 in a closed position.

Figure 3:
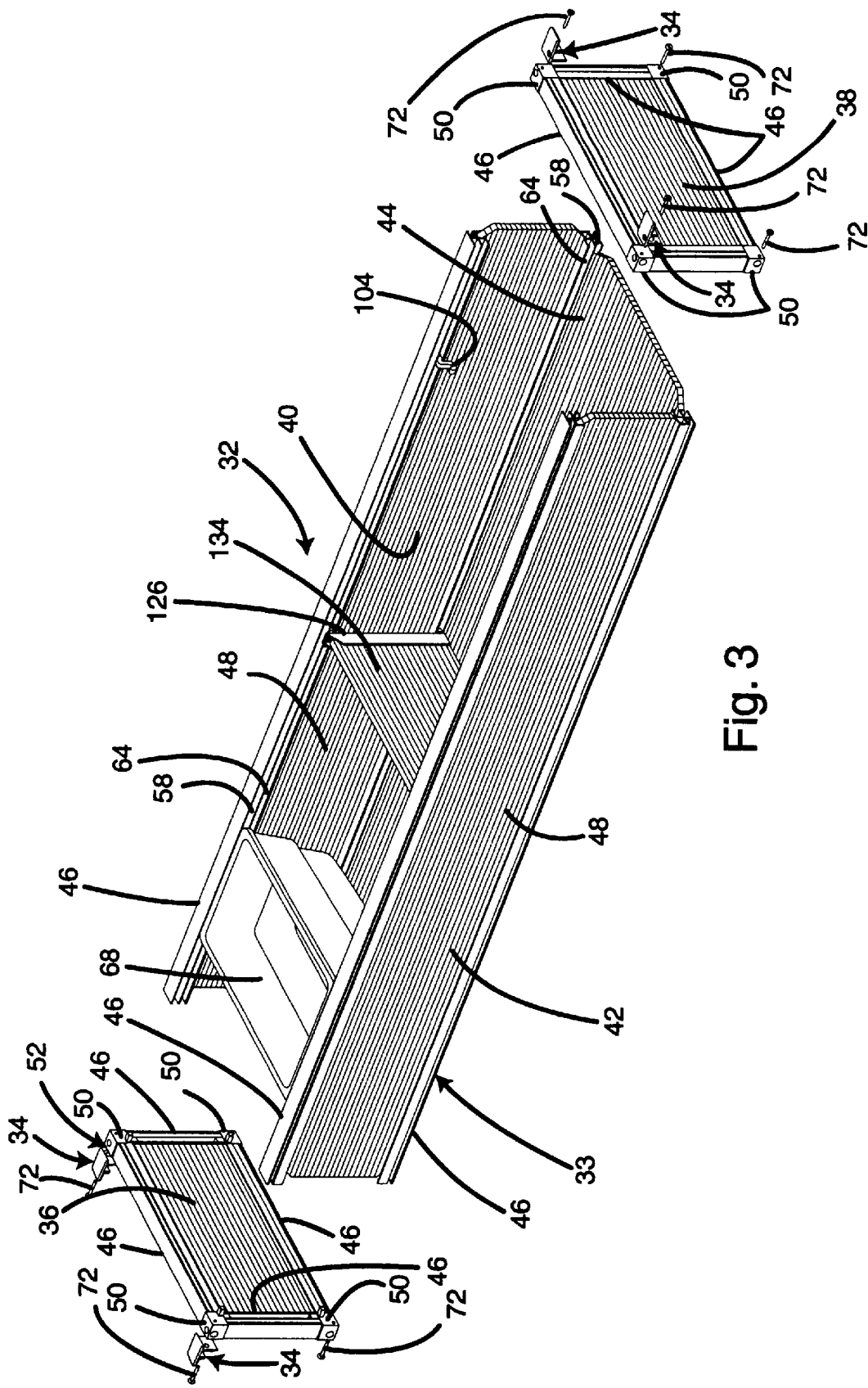
FIG. 3 is a partially exploded perspective view of the storage unit.
Figure 6:
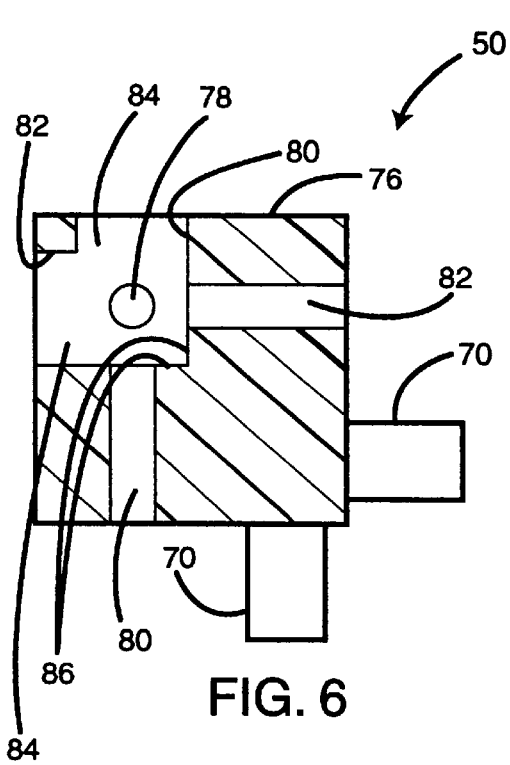
FIG. 6 is a cross-sectional view taken along line VI—VI.
Figure 7:
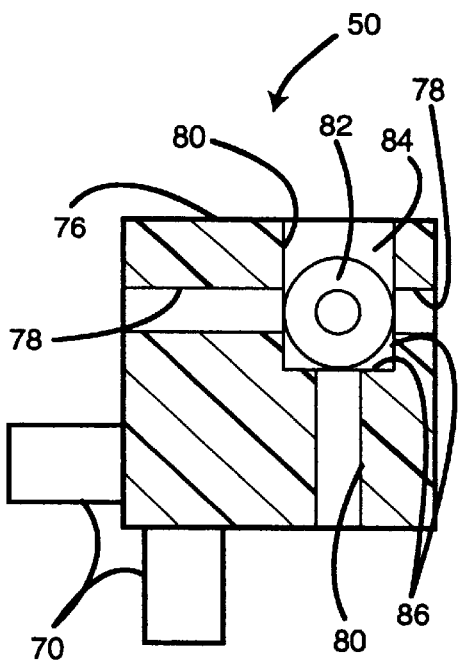
FIG. 7 is a cross-sectional view taken along line VII—VII.

Container 32 includes frame 33 and panels 48 to form a rectangular parallelepiped. (FIG. 3.) Panels 48 include left wall 36, right wall 38, front wall 40, rear wall 42, and bottom wall 44. Frame 33 includes a plurality of frame members 46, joint connectors 50, and fasteners 72. The plurality of frame members 46 form the outer frame 33 of the wall that surrounds panels 48. Joint connector 50 interconnects three frame members with fasteners 72 to form corners 52 of container 32.

Figure 8:
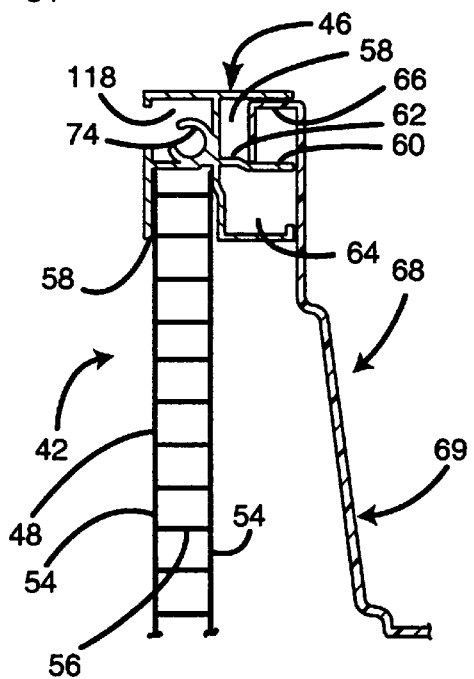
FIG. 8 is a fragmentary cross-sectional view taken along line VIII—VIII showing the frame member, hanging tray, and side panel.

Panels 48 can be made of any material structurally suitable for containers, including wood, metal, and plastic. In the embodiment shown in the drawings, the panels are an extruded polypropylene having external walls 54 interconnected by a plurality of internal webs 56. (FIG. 8.) Such a panel is lightweight and strong, yet provides flexibility for insertion into frame members 46, as will be discussed in more detail below.

Frame member 46 includes one or more panel slots 58 adapted to receive an edge of panel 48. (FIG. 8.) Each panel slot 58 runs the length of frame member 46. As shown, frame member 46 includes first and second panel slots 58 that are oriented perpendicularly to each other in order to receive panels to form walls having an essentially perpendicular orientation to each other. Panel slot 58 may include a slot entry portion 60 sized equal to or slightly larger than the edge thickness of panel 48, and an slot base portion 62, which is sized no greater than the thickness of panel 48. The relatively wider slot entry portion 60 facilitates insertion of panel 48; whereas, the relatively more narrow slot base portion provides a snug fit for panel 48 to assist in holding (i.e., "squeezing") the panel piece in position.

As shown, each frame member 46 includes a leg slot 64 running essentially the length of the interior side of the frame member between first and second panel slots 58. (FIG. 8) Leg slot 64 is adapted to receive a connector leg 70 of joint connector 50, as discussed below. Each frame member 46 also include receipt bore 74, which is adapted to receive fastener 72 (not shown), as discussed below.

Frame members 46 may be constructed of any material structurally suitable to support the container panels. Preferably, frame members 46 are constructed of aluminum for strength, weight, and ease-of-manufacturing advantages. To gain the advantages of standardization, each frame member 46 may have essentially the same cross-section and features.

Joint connector 50 (FIGS. 4–7) includes a joint connector base 76 having one or more integral connector legs 70 extending from the joint connector base 76. Each connector leg 70 is adapted for insertion into leg slot 64 of frame member 46 to assist in orienting and holding frame members 46 during assembly of container 32. As shown, the joint connector base 76 is generally cube shaped having first, second, and third bores 78, 80, and 82, respectively, extending through the base 76. Each of the bores 78, 80, and 82 has an axis that is generally perpendicular to and intersecting the axes of other two bores. The bores 78, 80, and 82 are adapted to receive a fastener such as a screw (not shown). Second bore 80 and third bore 82 are countersunk within the base 76 to a depth below the axis of first bore 78. The countersinking of bores 80 and 82 results in enlarged countersunk portions 84 so that the head of a fastener can fit through the enlarged countersunk portion of bores 80 and 82 to engage interior surface 86. Joint connector 50 may be made of any material suitable to withstand the stress of the connection application, including metal, wood, and plastic.

Each frame member 46 is connected to two other frame members 46 to form a corner 52 of container 32. Corner 52 can be formed by directly connecting the frame members to each other using welds, solder connections, or fasteners, such as screws, bolts, rivets, or the like. In the embodiment shown in the drawings, three frame members 46 are connected to each other using joint connector 50 and fasteners 72 to form a three dimensional frame joint. (FIG. 3.) A fastener 72 extends through each bore 78, 80, and 82 of joint connector base 76 into fastener receipt bore 74 of each frame member 46. Fasteners 72 may be any fastener device suitable for holding frame member 46 to joint connector base 76, such as screws, bolts, rivets, and the like.

Figure 11:
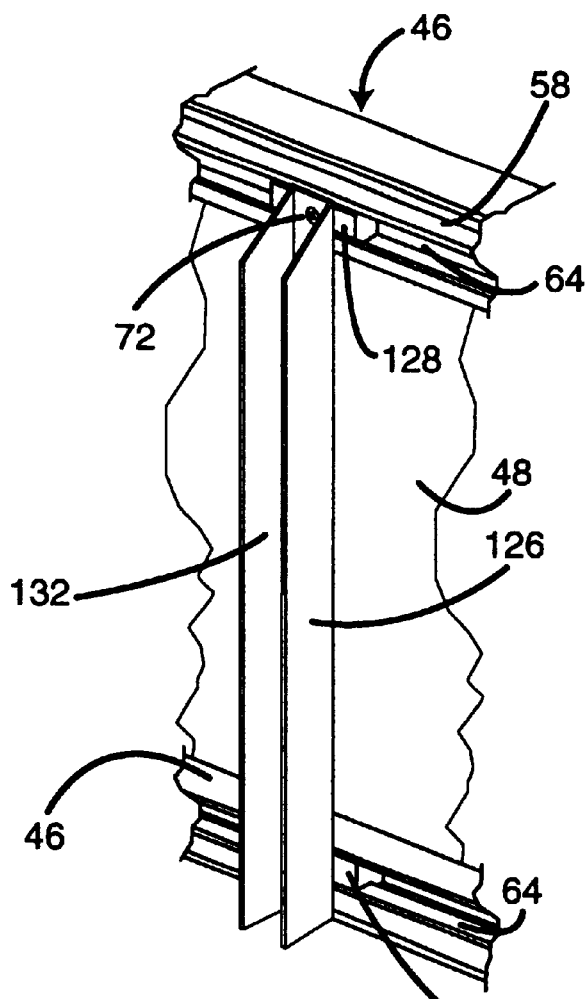
FIG. 11 is a perspective view of the divider of FIG. 3.
Figure 12:
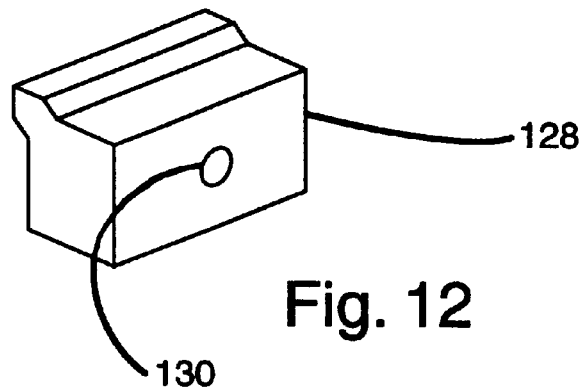
FIG. 12 is a perspective view of the divider nut of FIG. 11.

To help provide structural support, container 32 may include rigid divider supports 126 connected between the top and bottom frame members 46 and centrally located along the length of these frame members (FIGS. 3 and 11) or between the bottom two frame members (not shown). Divider support 126 may be constructed of any material structurally suitable to support the container frame. Divider support 126 may be directly connected to the frame members by welds, solder connections, or fasteners, such as screws, bolts, rivets, or the like. In the embodiment shown in the drawings, divider support 126 is connected on each end to divider nuts 128 that are slidably positioned within leg slot 64 of the frame members. Divider nut 128 is sized to conform to leg slot 64 and includes a nut bore 130 for receiving fastener 72. (FIG. 12.) Divider support 126 preferably includes divider slot 132 sized to receive a divider panel 134. Divider panel 134 may be of similar construction as panels 48.

Figure 9:
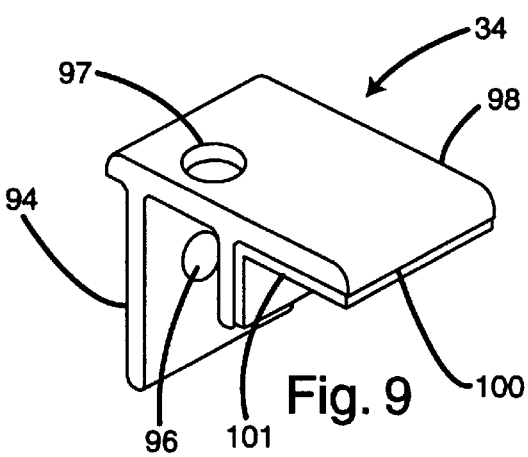
FIG. 9 is a perspective view of the hanger of FIG. 3.
Figure 13:
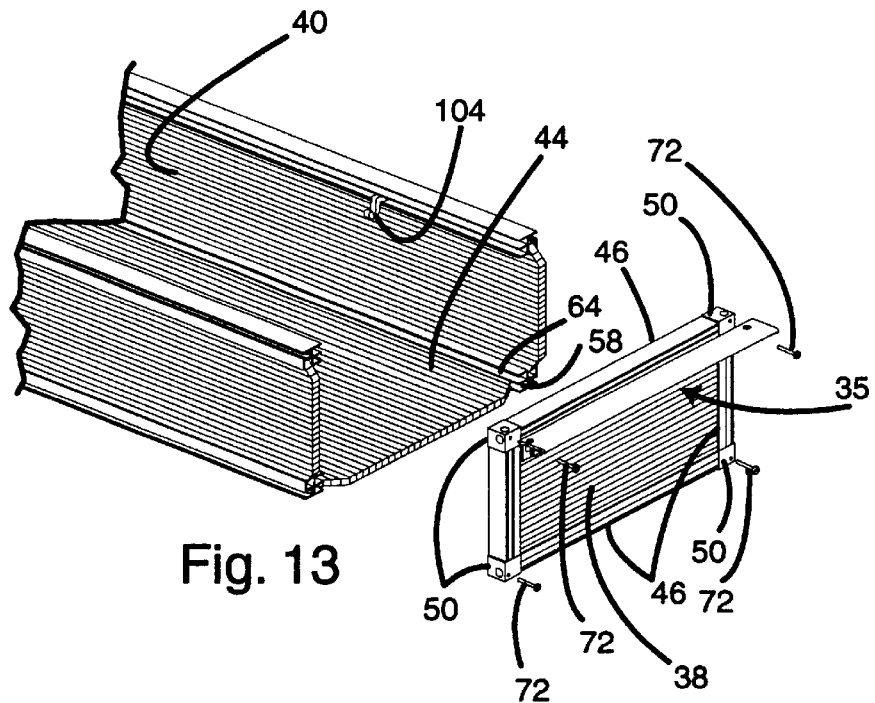
FIG. 13 is a partially exploded, perspective fragmentary view of the storage unit with an alternative hanger.
Figure 14:
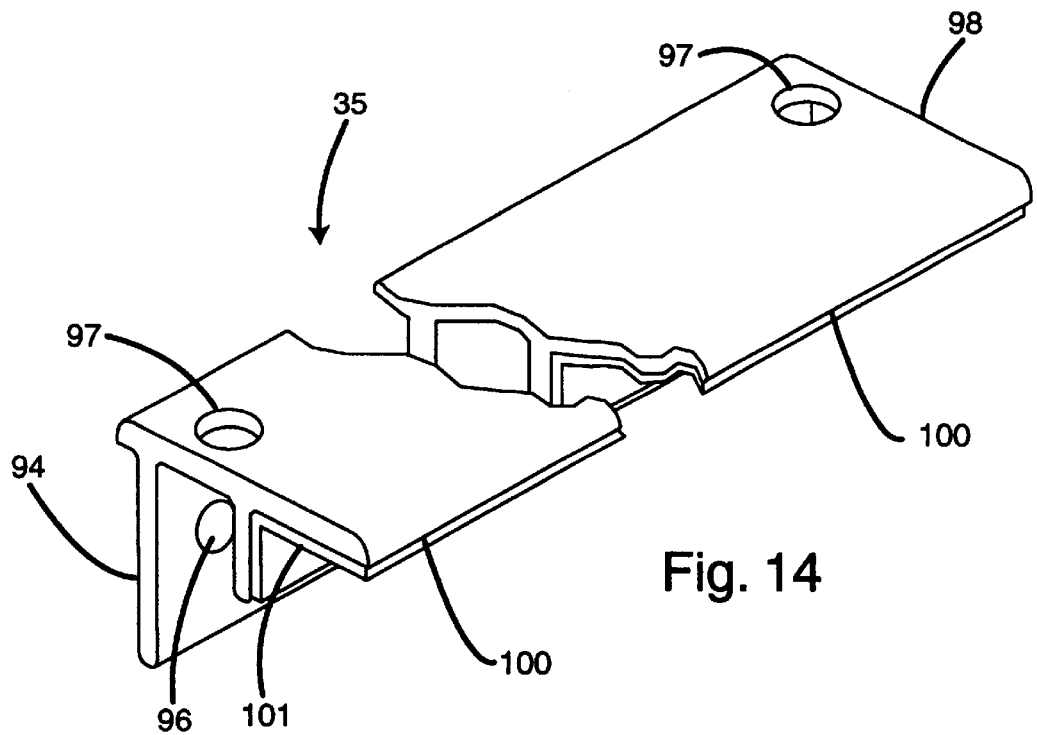
FIG. 14 is a perspective view of the hanger of FIG. 13.

Hangers 34 (FIGS. 2 and 9) and hanger 35 (FIGS. 13 and 14) include hanger base 94 and support portion 98 extending from hanger base 94. The hanger base 94 defines bore hole 96 for receiving fastener 72. The support portion defines bore 97 for receiving a bolt for the under-rail clamp, as discussed below. At least one fastener 72 extends through hanger bore hole 96 and joint connector bore 78 into fastener receipt bore 74 to hold hanger 34 or 35 in position. As depicted in FIG. 3, storage unit 20 includes four hangers 34 extending from the upper corners—two from each side of the storage unit. FIG. 13 shows an alternative hanging means wherein storage unit 20 has one hanger 35 mounted to and extending across the upper edge of the storage unit. Thus, as few as one hanger for each side of the storage container may be used; and more than two may also be used.

Figure 2:
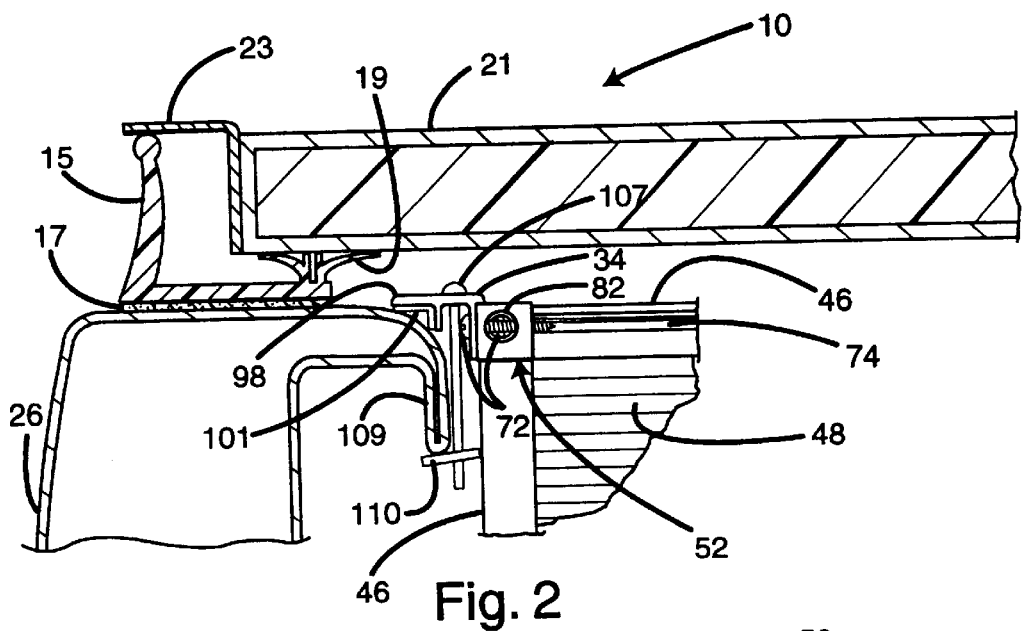
FIG. 2 is a fragmentary sectional view of the storage unit installed in a truck cargo bay having the folding cargo bay cover in the extended closed position.
Figures 4, 5:
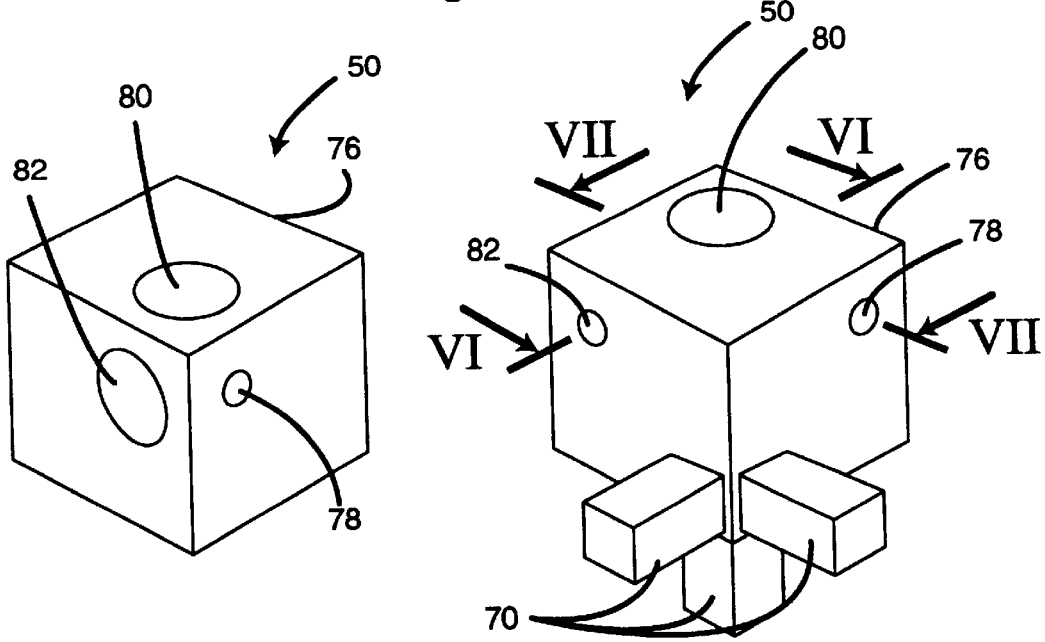
FIG. 4 is a front perspective view of the joint connector of FIG. 3.
FIG. 5 is a rear perspective view of the joint connector of FIG. 3.

Support portion 98 of hanger 34 or 35 (FIGS. 9 and 14, respectively) is adapted to rest on the top surface of a truck bed side wall. Preferably, support portion 98 defines a support surface 100 that is substantially in the same plane as the top surface of the corresponding frame members 46. (FIG. 3.) "Substantially in the same plane" includes differences in elevation of less than about one inch. Preferably, support surface 100 is formed by a resilient pad material 101, such as an adhesively-backed foam or sponge, that is adhered to the support portion 98. The pad 101 helps to prevent the hanger 34 or 35 from scratching the pickup truck sidewall 26. Also preferably, the support portion 98 has a profile height adapted for use with a low silhouette cover over the pickup cargo bay in which a storage unit 20 is installed. Such profile heights are such that the support portion 98 lies below a low silhouette cover positioned over the storage unit 20 and does not disrupt or prevent the closure or use a low silhouette cover. Such profile heights include those less than about one inch, more preferably less than about 0.5 inch, and most preferably less than about 0.25 bring up inch. For example, in the embodiment shown in the drawings, the profile height of support portion 98 does not extend above the gasket 19 supporting cover top 21. (FIG. 2.)

To provide a place to store and organize smaller articles, hanging tray 68 may be installed in a panel slot 58. (FIG. 8.) Tray 68 includes tray container portion 69 and lip 66 extending from tray container portion. Lip 66 is adapted for "snap-in" installation into panel slot 58 to support tray 68, so it can slide along panel slot 58. A suitable hanging tray 68 is available from Rubbermaid Corporation.

Figure 10:
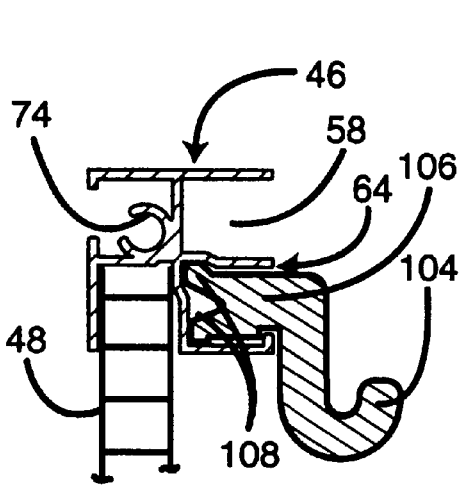
FIG. 10 is a cross-sectional view of a hanging hook inserted in the leg slot of a frame member.

To provide a place to hang articles such as bags and the like within storage unit 20, adjustable hook 104 may be installed in leg slot 64. (FIG. 10.) As depicted, the cross-section of extended portion 106 of hook 104 is Y-shaped having branch portions 108. Hook 104 can be formed of any suitable material; however, it is preferred that Y-shaped portion 106 be made of a resilient material allowing the branch portions 108 of the extended portion 106 to be biased toward each other during installation in leg slot 64. This allows a "snap-in" installation into leg slot 64 to avoid the need to install hook 104 in leg slot 64 before assembly of container 32.

The storage unit 20 may include means for removably securing the container 32 to the sidewall 26. As depicted in the drawings, the securing means is a hold down bolt 107 threaded through bore 97 of hanger 34 and under-rail clamp 110, which engages the under-rail 109 of sidewall 26.

Assembly of the Hanging Storage Unit

Container 32 can be provided in a "knocked-down" or unassembled mode to store and ship it in a compact package. To assemble container 32, panels 48 are inserted into panel slots 58 of frame members 46 to form the walls of container 32. Connector legs 70 of the joint connectors 50 are inserted in the corresponding leg slot 64 of frame members 46 to partially form the corners 52. A fastener 72 is inserted through each of joint connector second and third bores 80 and 82 into the corresponding fastener receipt bore 74 of a frame member 46 and tightened to form two of the connections for corner 52. After tightening, decorative hole plugs (not shown), which are known in the art, can be inserted into the enlarged countersunk portions 84 of the second and third bores 80 and 82. Before completing the corner connections, hanging tray 68 is inserted into panel slots 58 of the top frame members and the divider nuts 128 are inserted into leg slots 64 of the top and bottom frame members.

To complete the corner connections, hangers 34 or 35 are mounted to the top corners of container 32 by inserting fastener 72 through hanger base bore 96 and joint connector first bore 78 into the corresponding fastener receipt bore 74 of a frame member 46. The bottom four corner connections can be completed by using fasteners 72 as noted above but without hangers 34. A pad 101 is adhered to the support surface 100 of hanger 34. Hold down bolt 107 is threaded through bore 97 of hanger 34 or 35 into under-rail clamp 110, which will be tightened after the storage unit is in position in the truck bed. (FIG. 2.) Divider supports 126 are fastened to the divider nuts and the bottom support (not shown) is similarly installed. The optional divider panel 134 is installed in the divider slots 132 of divider support 126 to separate the container into two storage areas.

Once installed, tray 68 can slide laterally across the pickup truck bed along panel slot 58. Hook 104 can be installed in leg slot 64 by biasing Y-shaped branch portion 108 to snap the hook into leg slot 64. Once installed, hook 104 can slide to the desired position along leg slot 64 of the frame member.

Operation of the Hanging Storage Unit

Once assembled, container 32 is placed in the pickup truck bed 22 so that support portions 98 of hangers 34 or 35 rest on the top of the left and right sidewalls 26, 28 of pickup truck 24 to suspend container 32 from the hangers. (FIG. 2.) Each hold down bolt 107 is tightened to engage under-rail clip 110 with the under-rail 109 of the truck sidewall.

Storage unit 20 can be installed and used in conjunction with existing low profile or low silhouette pickup bed covers. Low profile or low silhouette bed covers are described in U.S. Pat. Nos. 4,844,531; 4,946,217; and 5,653, 491; each of which is incorporated in its entirety by this reference. As depicted in FIG. 2, existing folding cover 10 includes side rail 15 adhered to the top of pickup sidewall 26 by double sided tape 17. Side rail 15 supports cover lip 23, which extends laterally from cover top 21. Resilient gasket 19, or cover support portion engages cover top 21 to form a seal to help prevent water from entering the truck bed interior. Because the inventive storage unit 20 does not extend substantially above the sidewalls of the pickup truck—and further because and the support portions 98 have a relatively low profile height —the cover 10 can close over the support portions 98 without substantially disrupting the low profile or silhouette of the cover.

Storage unit 20 can be moved to the desired location along the length of truck bed 22 by disengaging the securing means and lifting or sliding the storage unit along the bed sidewalls. If a low silhouette folding cargo bay cover 10 is in the folded configuration (FIG. 1), then storage unit 20 can be positioned under the folded cover 10. Also, multiple storage units 20 can be installed in truck bed 22. The folding cover 10 can be unfolded and fully extended along the truck bed to cover multiple storage units. Tray 68 can be used to store or organize smaller items within container 32. Tray 68 can be slid laterally within the container 32 to provide access from the left or right sides of the pickup truck.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Any reference to an item in the disclosure or to an element in the claim in the singular using the articles "a," "an," "the," or "said" is not to be construed as limiting the item or element to the singular unless expressly so stated.

The embodiments of the invention in which an exclusive property or privilege is claimed are defined as follows:

1. A storage unit useful for a truck bed having left and right opposing sidewalls that define top surfaces and support a low silhouette cover, the cover including left and right rails mounted on the top surfaces of the left and right sidewalls respectively, each of said left and right rails including a cover support portion that together define a first plane, the cover resting on said cover support portions of said left and right rails, the storage unit comprising:

a container sized to fit entirely between the left and right truck bed sidewalls;

at least one left hanger extending leftward from the container over the left sidewall;

at least one right hanger extending rightward from the container over the right sidewall; and each left and right hanger being independent of said rails and having a support portion adapted to rest on the top surface of the respective truck bed sidewall, each support portion having a profile height adapted for use with the low silhouette cover, the support portions defining a second plane even with or below said first plane, wherein the container is capable of suspension from the sidewalls with the container lying entirely within or below said first plane.

2. The storage unit of claim 1 wherein each support portion has a profile height of less than about 0.5 inches.

3. The storage unit of claim 1 further comprising only one left hanger and only one right hanger.

4. A storage system useful for a truck bed having left and right sidewalls, the storage system comprising:

the storage unit of claim 1, whereby the storage unit is adapted to be suspended from the left and right sidewalls of the truck bed; and a low silhouette truck bed cover adapted to cover the storage unit suspended from the left and right sidewalls of the pickup truck bed.

5. A storage unit useful for a truck bed having left and right opposing sidewalls with sidewall top surfaces, the storage unit comprising:

left and right rails adapted to be mounted on the top surfaces of the left and right sidewalls respectively, each of said left and right rails including a cover support portion that together define a first plane;

a low silhouette truck bed cover adapted to removably cover the truck bed interior, said cover supported by said cover support portions of said left and right rails when said cover covers the truck bed interior, said cover being supported even with or above said first plane;

a container sized to fit entirely between the left and right sidewalls of the truck bed, the container having corresponding opposing left and right walls each defining an upper outer edge;

at least one left support portion extending outwardly from the upper outer edge of the container left wall, the left support portion defining a support surface adapted to rest on top of the truck bed left sidewall, said left support portion being independent of said rails; and at least one right support portion extending outwardly from the upper outer edge of the container right wall, the right support portion defining a support adapted to rest on top of the truck bed right sidewall, said left and right support surfaces together defining a second plane, said right support portion being independent of said rails, wherein the container is capable of suspension from the sidewalls with the container lying entirely within or below said first plane.

6. The storage unit of claim 5 wherein the left and right support portions have a profile height of less than about 0.5 inches.

7. The storage unit of claim 5 wherein:

the container left and right walls are connected by opposing front and rear walls to form left upper front and rear corners and right upper front and rear corners; and one of the support portions extends proximate each of the left upper front, left upper rear, right upper front, and right upper rear corners, whereby the support surfaces of the support portions are capable of contacting the truck bed sidewalls in at least four areas of contact to suspend the storage unit from the top of the truck bed sidewalls.

8. The storage unit of claim 5 wherein the container has a rectangular-sided polyhedron shape and includes:

a frame forming the edges of the container; and left, right, front, rear, and bottom panels mounted in the frame.

9. The storage unit of claim 8 wherein:

the frame includes a plurality of frame members; and each corner of the polyhedron shape is formed by a frame member connected to two other frame members.

10. The storage unit of claim 9 wherein each frame member has an essentially identical cross-section to the other frame members.

11. The storage unit of claim 9 further comprising:

at least eight frame members each including first and second panel slots oriented perpendicular to each other and running the length of the frame member, each panel slot adapted to receive an edge of one of the panels; and at least four frame members including at least one panel slot running the length of each frame member and adapted to receive an edge of one of the panels.

12. The storage unit of claim 11 wherein each panel slot defines a slot entry portion proximate the opening of the panel slot and a slot base portion proximate the base of the panel slot, the slot entrance portion sized larger than the edge thickness of the panel, whereby the insertion of the panel into the panel slot can be facilitated; and the slot base portion is sized no greater than the thickness of the panel, whereby the slot base portion provides a snug fit to assist holding the panel.

13. A storage unit useful for a truck bed having left and right opposing sidewalls with sidewall top surfaces defining a common plane, the storage unit comprising:

a container sized to fit entirely between the left and right sidewalls of the truck bed, the container having corresponding opposing left and right walls each defining an upper outer edge, said container having a rectangular-sided polyhedron shape;

a frame forming the edges of the container, said frame including a plurality of frame members, each corner of the polyhedron shape is formed by a frame member connected to two other frame members;

left, right, front, rear, and bottom panels mounted in the frame;

at least one left support portion extending outwardly from the upper outer edge of the container left wall, the left support portion defining a support surface lying substantially in the common plane, the left support surface adapted to rest on top of the truck bed left sidewall;

at least one right support portion extending outwardly from the upper outer edge of the container right wall, the right support portion defining a support surface lying substantially in the common plane, the right support surface adapted to rest on top of the truck bed right sidewall, wherein the container is capable of suspension from the sidewalls with the container lying entirely within or below the common plane;

a joint connector including a joint connector base defining first, second, and third bores extending through the joint connector base, each bore having a bore axis in an orientation generally perpendicular to the other two bore axes, the second and third bores being countersunk to a depth below the first bore axis, each corner is formed by said joint connector attached to three frame members; and a fastener in each of the first, second, and third bores extending into one of the frame members, whereby the frame member is attached to the joint connector base to form a three-dimensional frame joint.

14. The storage unit of claim 13 wherein the joint connector further comprises one or more connector legs extending from the joint connector base, each connector leg adapted for insertion into a frame member.

15. The storage unit of claim 13 wherein each support portion extends from a hanger base mounted to the joint connector base by a fastener extending through the first bore into the frame member.

16. The storage unit of claim 13 further comprising means for removably securing the support portion to the truck bed sidewall.

17. A storage unit useful for a truck bed having left and right opposing sidewalls with sidewall top surfaces defining a common plane, the storage unit comprising:

a container sized to fit entirely between the left and right sidewalls of the truck bed, the container having corresponding opposing left and right walls each defining an upper outer edge, said container having a rectangular-sided polyhedron shape;

a frame forming the edges of the container, said frame including at least eight frame members each including first and second panel slots oriented perpendicular to each other and running the length of the frame member, said frame further including at least four frame members including at least one panel slot running the length of each frame member, each corner of the polyhedron shape is formed by a frame member connected to two other frame members;

left, right, front, rear, and bottom panels mounted in the frame, each panel slot adapted to receive an edge of one of the panels;

at least one left support portion extending outwardly from the upper outer edge of the container left wall, the left support portion defining a support surface lying substantially in the common plane, the left support surface adapted to rest on top of the truck bed left sidewall;

at least one right support portion extending outwardly from the upper outer edge of the container right wall, the right support portion defining a support surface lying substantially in the common plane, the right support surface adapted to rest on top of the truck bed right sidewall, wherein the container is capable of suspension from the sidewalls with the container lying entirely within or below the common plane;

each frame member forming the opposing front and rear upper edges including a tray slot running essentially the length of the interior side of the frame member; and a hanging tray having a tray container portion and at least one lip extending outwardly from the hanging tray and adapted to fit within the tray slot to support the hanging tray, wherein the hanging tray can be suspended from the tray slots by one or more of the lips.

18. The storage unit of claim 17 wherein one or more of the lips of the hanging tray are removably and slidably installed in the tray slots.

19. A storage unit useful for a truck bed having left and right opposing sidewalls with sidewall top surfaces defining a common plane, the storage unit comprising:

a container sized to fit entirely between the left and right sidewalls of the truck bed, the container having corresponding opposing left and right walls each defining an upper outer edge, said container having a rectangular-sided polyhedron shape;

a frame forming the edges of the container, said frame including at least eight frame members each including first and second panel slots oriented perpendicular to each other and running the length of the frame member, said frame further including at least four frame members including at least one panel slot running the length of each frame member, each corner of the polyhedron shape is formed by a frame member connected to two other frame members;

left, right, front, rear, and bottom panels mounted in the frame, each panel slot adapted to receive an edge of one of the panels, a slot entry portion defined by each panel slot, proximate the opening of the panel slot and a slot base portion proximate the base of the panel slot, the slot entrance portion sized larger than the edge thickness of the panel, whereby the insertion of the panel into the panel slot can be facilitated, the slot base portion is sized no greater than the thickness of the panel, whereby the slot base portion provides a snug fit to assist holding the panel;

at least one left support portion extending outwardly from the upper outer edge of the container left wall, the left support portion defining a support surface lying substantially in the common plane, the left support surface adapted to rest on top of the truck bed left sidewall;

at least one right support portion extending outwardly from the upper outer edge of the container right wall, the right support portion defining a support surface lying substantially in the common plane, the right support surface adapted to rest on top of the truck bed right sidewall, wherein the container is capable of suspension from the sidewalls with the container lying entirely within or below the common plane; and a hanging hook slidably and removably mounted in a slot in at least one frame member forming the upper edge, the hanging hook having an outwardly extending lip adapted to be inserted into the slot of the frame member to support the hanging hook.

20. A storage system useful for a truck bed having an interior and left and right opposing sidewalls that define top surfaces, the storage system comprising:

left and right rails adapted to be mounted on the top surfaces of the left and right sidewalls respectively, each of said left and right rails including a cover support portion that together define a first plane;

a low silhouette truck bed cover adapted to removably cover the truck bed interior, said cover resting on said cover support portions of said left and right rails when said cover covers the truck bed interior;

a container sized to fit between the left and right truck bed sidewalls;

at least one left hanger extending leftward from the container over the left sidewall;

at least one right hanger extending rightward from the container over the right sidewall; and each left and right hanger being independent of said rails and having a support portion adapted to rest on the top surface of the respective truck bed sidewall and below the low silhouette truck bed cover, the support portions defining a second plane even with or below said first plane, wherein the container is capable of suspension from the sidewalls with the container lying entirely within or below the first plane.

* * * * *